United States Patent
He-Lee et al.

(10) Patent No.: US 9,103,041 B2
(45) Date of Patent: Aug. 11, 2015

(54) METHOD FOR IMPROVING SURFACE PROPERTIES OF THE STAINLESS STEELS FOR BIPOLAR PLATE OF POLYMER ELECTROLYTE MEMBRANE FUEL CELL

(75) Inventors: Jeong He-Lee, Pohang-si (KR); Young Hwan Kim, Pohang-si (KR); Jong Hee Kim, Daejeon (KR)

(73) Assignee: POSCO, Pohang-Si, Gyeongsangbuk-do (KR)

( * ) Notice: Subject to any disclaimer, the term of this patent is extended or adjusted under 35 U.S.C. 154(b) by 606 days.

(21) Appl. No.: 12/521,550

(22) PCT Filed: Dec. 27, 2007

(86) PCT No.: PCT/KR2007/006908
§ 371 (c)(1),
(2), (4) Date: Jan. 6, 2010

(87) PCT Pub. No.: WO2008/082162
PCT Pub. Date: Jul. 10, 2008

(65) Prior Publication Data
US 2010/0132842 A1    Jun. 3, 2010

(30) Foreign Application Priority Data

Dec. 28, 2006 (KR) ............ 10-2006-0137074
Dec. 20, 2007 (KR) ............ 10-2007-0134584
Dec. 20, 2007 (KR) ............ 10-2007-0134585

(51) Int. Cl.
*C23C 22/02* (2006.01)
*C23G 1/08* (2006.01)
(Continued)

(52) U.S. Cl.
CPC ............. *C23G 1/081* (2013.01); *C23C 22/34* (2013.01); *H01M 8/021* (2013.01); *H01M 2008/1095* (2013.01); *Y02E 60/50* (2013.01)

(58) Field of Classification Search
CPC ........ C23C 22/34; C23G 1/081; H01M 8/021
USPC .................................................. 148/222, 243
See application file for complete search history.

(56) References Cited

U.S. PATENT DOCUMENTS

| | | | |
|---|---|---|---|
| 6,379,476 | B1 | 4/2002 | Tarutani et al. |
| 7,070,877 | B2 | 7/2006 | Morita et al. |

(Continued)

FOREIGN PATENT DOCUMENTS

| | | |
|---|---|---|
| CN | 1271027 A | 10/2000 |
| CN | 1608144 A | 4/2005 |

(Continued)

OTHER PUBLICATIONS

First Office Action dated May 18, 2011, in Chinese Patent Application No. 200780048358.X (4 pages of Office Action and 5 pages of translation, 9 pages total).

(Continued)

*Primary Examiner* — Rebecca Lee
(74) *Attorney, Agent, or Firm* — Finnegan Henderson Farabow Garrett & Dunner LLP

(57) ABSTRACT

Disclosed is a method for improving surface properties of the stainless steels for bipolar plate of polymer electrolyte membrane fuel cell having low interfacial contact resistance and excellent corrosion resistance. The method for improving surface properties of the stainless steels according to one exemplary embodiment of the present invention includes: pickling a stainless steel with an aqueous sulfuric acid solution, the stainless steel comprising, by weight: C: 0.02% or less, N: 0.02% or less, Si: 0.4% or less, Mn: 0.2% or less, P: 0.04% or less, S: 0.02% or less, Cr: 25-32%, Mo: 0.1 to 5%, Cu: 0.1 to 2%, Ti: 0.5% or less, Nb: 0.5% or less, and the balance of Fe and other inevitable elements, and then washing the stainless steel with water, and then immersing the stainless steel in a mixture solution of nitric acid and hydrofluoric acid to form a passivation layer.

5 Claims, 4 Drawing Sheets

(51) Int. Cl.
*C23C 22/34* (2006.01)
*H01M 8/02* (2006.01)
*C23C 22/73* (2006.01)
*H01M 8/10* (2006.01)

(56) References Cited

U.S. PATENT DOCUMENTS

| | | | |
|---|---|---|---|
| 2001/0051225 A1* | 12/2001 | Van Ooij et al. | 427/433 |
| 2005/0040138 A1 | 2/2005 | Sato et al. | |
| 2006/0053627 A1 | 3/2006 | Budinski et al. | |
| 2006/0204818 A1* | 9/2006 | Chiba et al. | 429/34 |
| 2008/0233456 A1 | 9/2008 | Ishikawa et al. | |

FOREIGN PATENT DOCUMENTS

| | | | | |
|---|---|---|---|---|
| DE | 103 13 920 A1 | 10/2003 | | |
| EP | 1726674 A1 * | 11/2006 | | H01M 8/02 |
| JP | 05-271880 | 10/1993 | | |
| JP | 08-239733 | 9/1996 | | |
| JP | 2001-214286 | 8/2001 | | |
| JP | 2002-275651 | 9/2002 | | |
| JP | 2003-286592 | 10/2003 | | |
| JP | 2003286592 A * | 10/2003 | | C23G 1/08 |
| JP | 2005-302713 | 10/2005 | | |
| JP | 2006-265090 | 10/2006 | | |
| JP | 2006-265664 | 10/2006 | | |
| JP | 2006-318652 | 11/2006 | | |
| JP | 2009-041041 | 2/2009 | | |
| KR | 10-0851687 | 8/2008 | | |
| WO | WO 2006/036241 | 4/2006 | | |

OTHER PUBLICATIONS

Decision of Rejection mailed May 8, 2012, from the Japanese Patent Office in corresponding Japanese Pat. App. No. 2009-543948, and English translation thereof (5 pages total).

Office Action issued on Sep. 13, 2013, from the German Patent Office in corresponding German Pat. App. No. 11 2007 003 189.1, 6 pages.

Office Action issued Apr. 9, 2013, from the Japanese Patent Office in corresponding Jap. Pat. App. No. 2009-543948.

* cited by examiner

METHOD FOR IMPROVING SURFACE PROPERTIES OF THE STAINLESS STEELS FOR BIPOLAR PLATE OF POLYMER ELECTROLYTE MEMBRANE FUEL CELL

TECHNICAL FIELD

The present invention relates to a method for improving surface properties of the stainless steels for bipolar plate of polymer electrolyte membrane fuel cell having low interfacial contact resistance and excellent corrosion resistance, and more particularly to a method for improving surface properties of the stainless steels ensuring low interfacial contact resistance and excellent corrosion resistance at the same time.

BACKGROUND ART

In recent years, the energy depletion, the environmental pollution and the like have issued as global problems, and therefore hydrogen energy and fuel cells using the hydrogen energy have been increasingly used as a substitute of fossil fuel. Fuel cell transforms chemical energy of hydrogen into electrical energy. Fuel cell may use a variety of fuels, and pollutants are hardly generated. Furthermore, an energy saving effect is high due to the high power generation efficiency (40% or more).

These fuel cells may be widely used in the fields of various applications including transportations such as automobiles, ships, airplanes, etc.; power supplies such as electric generating plants, household power supplies, etc, and portable electric home appliances, etc.

The polymer fuel cell may be operated at room temperature and atmospheric pressure since it uses a solid polymer membrane having ion conductivity as an electrolyte. Also, the polymer fuel cell has come to the highlight as a power source for transportations, portable and household appliances, etc. since it has a low operating temperature (about 80° C.), a short operating time and a high power density.

In general, the solid polymer fuel cell includes a plurality of bipolar plates, each of them having a channel formed therein. Such bipolar plates are generally formed of one selected from the group consisting of graphite, carbon, Ti alloy, stainless steel and conductive plastics.

However, the bipolar plate formed of stainless steel has problems that interfacial contact resistance between a surface of the bipolar plate and a membrane-electrode assembly may be increased due to the semiconductive characteristics of a passivation layer formed in the surface of the bipolar plate.

Furthermore, the polymer fuel cell is operated under an acid atmosphere, but ion conductivity of an electrolyte membrane may be reduced due to the extraction of metal ions when the stainless bipolar plate does not ensure its corrosion resistance, and thereby an electrode catalyst may be polluted, which leads to deteriorate the performances of a fuel cell.

DISCLOSURE OF INVENTION

Technical Problem

Accordingly, the present invention is designed to solve such drawbacks of the prior art, and therefore an object of the present invention is to provide a method for improving surface properties of the stainless steels for bipolar plate of polymer electrolyte membrane fuel cell ensuring low interfacial contact resistance and excellent corrosion resistance at the same time.

Technical Solution

One embodiment of the present invention is achieved by providing a method for improving surface properties of the stainless steels for bipolar plate of polymer electrolyte membrane fuel cell having low interfacial contact resistance and excellent corrosion resistance, the method comprises the steps of: pickling a stainless steel with an aqueous sulfuric acid solution, the stainless steel comprising, by weight: C: 0.02% or less, N: 0.02% or less, Si: 0.4% or less, Mn: 0.2% or less, P: 0.04% or less, S: 0.02% or less, Cr: 25~32%, Mo: 0.1 to 5%, Cu: 0.1 to 2%, Ti: 0.5% or less, Nb: 0.5% or less, and the balance of Fe and other inevitable elements, and then washing the stainless steel with water, and then immersing the stainless steel in a mixture solution of nitric acid and hydrofluoric acid to form a passivation layer.

BRIEF DESCRIPTION OF THE DRAWINGS

The accompanying drawings, together with the specification, illustrate exemplary embodiments of the present invention, and, together with the description, serve to explain the principles of the present invention.

MODE FOR THE INVENTION

Hereinafter, preferable embodiments according to the present invention will be described with reference to the accompanying drawings. Here, irrelative elements are omitted for clarity. Also, like reference minerals refer to like elements throughout.

Figure 1:
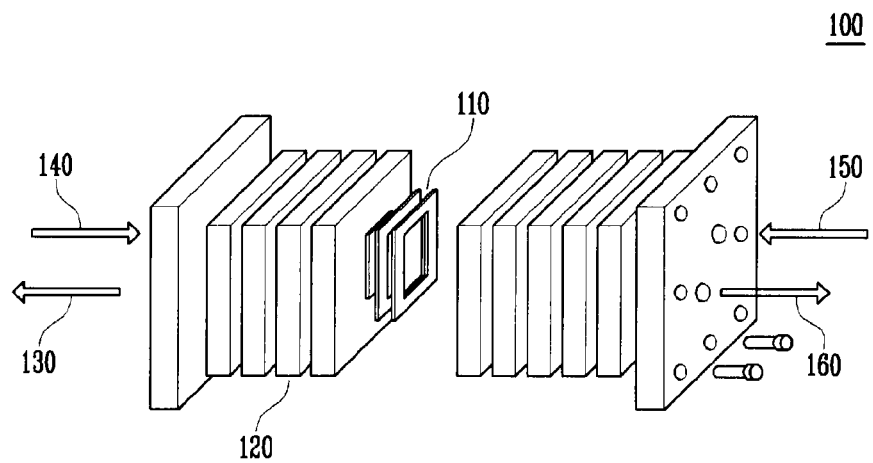
FIG. 1 is a perspective view illustrating a fuel cell including a bipolar plate that is formed of stainless steel whose surface properties are improved according to one exemplary embodiment of the present invention.

FIG. 1 is a perspective view illustrating a fuel cell including a bipolar plate that is formed of stainless steel whose surface properties is improved according to one exemplary embodiment of the present invention.

As shown in FIG. 1, a solid polymer fuel cell 100 includes a membrane-electrode assembly 110 including an electrolyte, electrodes (anode and cathode) and a gas-sealing gasket; a plurality of bipolar plates 120 having a channel formed therein; air inlet/outlet 130 and 140; and an end plate having hydrogen gas inlet/outlet 150 and 160.

The bipolar plate 120 may be generally formed of one selected from the group consisting of graphite, carbon, Ti alloys, stainless steel and conductive plastics, and preferably formed of stainless steel.

The stainless steel may be manufactured into a thin plate since it has excellent ductility. Therefore a bipolar plate 120 with a channel may be formed of the stainless steel by low-priced manufacturing methods such as press molding and hydro forming. The stainless steel has characteristics such as impact resistance, gas impermeability and corrosion resistance.

The bipolar plate 120 may be formed of stainless steel, which has low interfacial contact resistance and excellent corrosion resistance by the method for improving surface properties of the stainless steels according to one exemplary embodiment of the present invention.

Hereinafter, the components and compositions of the stainless steel according to the present invention will be described in detail. In the following description, all percents are by weight unless otherwise indicated.

C and N react to form Cr carbonitrides in the steel, and therefore both of the elements are preferably used in a small amount since corrosion resistance of steel is deteriorated in a Cr-depleted layer. For the present invention, the contents of C and N are limited to amount of C: 0.02% or less and N: 0.02% or less, respectively.

Si is an element that is effectively used for deoxidation of the steel, but deteriorates toughness and formability of the steel, and therefore the Si content is limited to less than 0.4% in the present invention.

Mn is an element that increases deoxidation of steel, but an inclusion MnS functions to reduce corrosion resistance of steel. For the present invention, the Mn content is limited to an amount of less than 0.2%.

P functions to reduce toughness and corrosion resistance of steel, and therefore the P content is limited to less than 0.4% in the present invention.

S functions to form MnS, and this MnS becomes the starting point of corrosion to reduce corrosion resistance of steel. For the present invention, the S content is limited to less than 0.2%.

Cr functions to enhance corrosion resistance of steel under an acid atmosphere where a fuel cell operates but reduce toughness of the steel, and therefore the Cr content is limited to a range of 25% to 32% in the present invention.

Mo functions to enhance corrosion resistance of steel under an acid atmosphere where a fuel cell operates but reduce toughness of the steel, and therefore the Mo content is limited to a range of 0.1% to 5% in the present invention.

Cu functions to enhance corrosion resistance of steel under an acid atmosphere where a fuel cell operates, but may deteriorate performances of the fuel cell due to the extraction of Cu when the Cu is added in an excessive amount. For the present invention, the Cu content is limited to a range of 0.1% to 2%.

Ti and Nb are useful elements that make C and N in the steel form carbonitrides, but deteriorates the toughness of the steel. For the present invention, a composition ratio of the Cu element is limited to an amount of 0.5% or less.

In addition to the above-mentioned elements, one or two or more elements of V, W, La, Zr and B may be added herein, and their composition ratios are described, as follows.

V functions to enhance corrosion resistance of steel under an acid atmosphere where a fuel cell operates, but may deteriorate performances of the fuel cell due to the extraction of V ions when the V is added in an excessive amount. For the present invention, the V content is limited to an amount of 0.1% or less.

W functions to enhance corrosion resistance of steel under an acid atmosphere where a fuel cell operates and reduce interfacial contact resistance of steel, but deteriorates toughness of steel when the V is added in an excessive amount. For the present invention, the W content is limited to an amount of 4% or less.

La functions to induce micro dispersion of a sulfide-based inclusion in steel and induce a passivation layer to be distributed densely, but may cause a nozzle-clogging problems when the La is added in an excessive amount. For the present invention, the La content is limited to an amount of 1% or less.

Zr functions to enhance corrosion resistance of steel under an acid atmosphere where a fuel cell operates and reduce interfacial contact resistance of steel, but may cause surface defects of steel when the Zr element is added in an excessive amount. Therefore, the Zr content is limited to an amount of 1% or less.

B functions to form nitrides in steel and improve corrosion resistance of the steel, but may cause surface defects of steel when the B element is added in an excessive amount. Therefore, the B content is limited to an amount of 1% in the present invention.

Hereinafter, the method for improving surface properties of the stainless steels for bipolar plate of polymer electrolyte membrane fuel cell according to one exemplary embodiment of the present invention will be described in detail.

First, ferritic stainless steel materials, including, by weight: C: 0.02 or less, N: 0.02 or less, Si: 0.4 or less, Mn: 0.2 or less, P: 0.04 or less, S: 0.02 or less, Cr: 25 to 32%, Mo: 0.1 to 5%, Cu: 0.1 to 2%, Ti: 0.5% or less, Nb: 0.5% or less, and the balance of Fe and other inevitable elements, is manufactured into a cast slab using a continuous casting process, or a steel ingot process. This cast slab is subject to processes such as a hot-rolling process, an annealing process, a pickling process, a cold-rolling process, and the like to manufacture a cold-rolled annealing plate having a thickness of 0.05 to 2 mm.

The stainless steel may further include one or two or more elements selected from the group consisting of V: 0 to 1%, W: 0 to 4%, La: 0 to 1%, Zr: 0 to 1% and B: 0 to 0.1%.

The bipolar plate for polymer fuel cell is made of the resulting cold-rolled annealing plate using the press molding and hydro forming processes.

Then, surface roughness of the annealed plate is adjusted to a range of 0.01 to 5 μm using a shot blast and a wire brush, and then is subject to a degreasing process.

Subsequently, an acid cleaning process for removing a passivation layer formed in a surface of a bipolar plate is carried out by immersing the annealed plate in 5 to 20% by weight of an aqueous sulfuric acid solution at 50 to 75° C. for 20 seconds to 5 minutes, followed by undergoing a washing the immersed plate.

And, a passivating process is carried out by immersing the washed plate in a mixture solution including 10 to 20% by weight of nitric acid and 1 to 10% by weight of hydrofluoric acid at 40 to 60° C. for 30 seconds to 10 minutes, followed by undergoing a washing the passivated plate.

When the above-mentioned chemical improvement of surface properties is completed, the plate is subject to a plasma nitriding process at 200 to 500° C. for 1 minute to 5 hours. CrN and $Cr_2N$ are formed on a surface of a bipolar plate by means of the plasma nitriding process, which leads to the improved corrosion resistance and the reduced interfacial contact resistance in the steel.

Hereinafter, exemplary embodiments of the present invention will be described in more detail, based on the experimental results obtained by the present inventors.

Table 1 lists components of stainless steel used in this experiment, and their composition ratios (% by weight).

Figure 2:
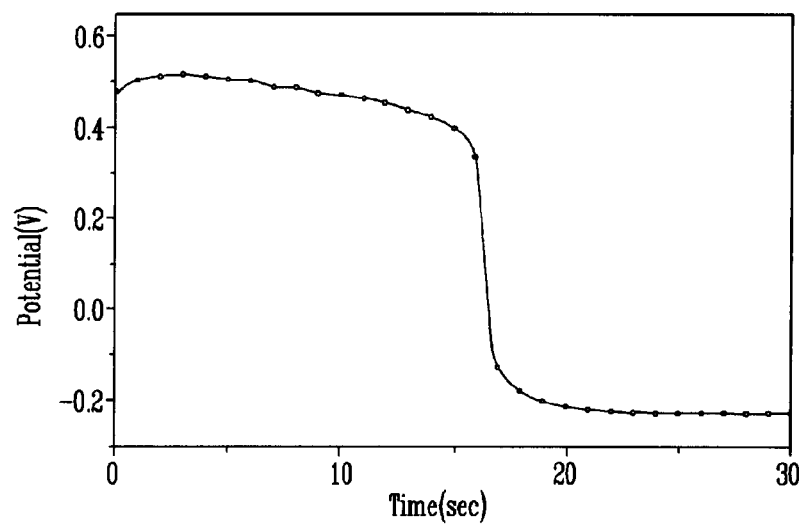
FIG. 2 is a diagram schematically illustrating a potential of Inventive steel 1 measured at 70° C. in 15% by weight of sulfuric acid solution using a saturated calomel electrode as a reference electrode.

FIG. 2 is a diagram schematically illustrating a potential of Inventive steel 1 measured at 70° C. in 15% by weight of sulfuric acid solution using a saturated calomel electrode as a reference electrode.

A protective oxide film is generally formed in a surface of a stainless steel. This oxide film is composed of iron-chromium oxide, thereby it should be removed since it is unsuitably used in the present invention due to the high content of iron.

As shown in FIG. 2, when the oxide film is formed in the Inventive steel 1, the Inventive steel 1 has a higher potential than the Inventive steel 1 whose surface does not exist the

TABLE 1

|  | C | Si | Mn | P | S | Al | Cr | Ni | Cu | Ti | Nb | Mo | Ohters | N |
|---|---|---|---|---|---|---|---|---|---|---|---|---|---|---|
| Inventive steel 1 | 0.009 | 0.290 | 0.142 | Less than 0.003 | Less than 0.002 | 0.048 | 26.26 | 0.173 | 0.437 | 0.058 | 0.241 | 2.03 | | 0.009 |
| Inventive steel 2 | 0.007 | 0.273 | 0.146 | Less than 0.003 | Less than 0.002 | 0.058 | 26.33 | 0.167 | 0.436 | 0.059 | 0.250 | 4.04 | | 0.009 |
| Inventive steel 3 | 0.008 | 0.269 | 0.145 | Less than 0.003 | Less than 0.002 | 0.055 | 30.01 | 0.169 | 0.430 | 0.060 | 0.245 | 2.13 | | 0.009 |
| Inventive steel 4 | 0.006 | 0.293 | 0.143 | Less than 0.003 | Less than 0.002 | 0.041 | 30.29 | 0.168 | 0.400 | 0.046 | 0.242 | 4.03 | | 0.008 |
| Inventive steel 5 | 0.006 | 0.303 | 0.140 | Less than 0.003 | Less than 0.002 | 0.027 | 28.55 | 0.181 | 0.412 | 0.041 | 0.241 | 3.19 | | 0.009 |
| Inventive steel 6 | 0.008 | 0.341 | 0.146 | Less than 0.003 | Less than 0.002 | 0.039 | 30.66 | 0.181 | 0.442 | 0.041 | 0.245 | 2.03 | 0.0013 La | 0.012 |
| Inventive steel 7 | 0.008 | 0.307 | 0.140 | Less than 0.003 | Less than 0.002 | 0.030 | 29.68 | 0.190 | 0.421 | 0.039 | 0.240 | 2.12 | 0.420 W | 0.008 |
| Inventive steel 8 | 0.008 | 0.263 | 0.145 | Less than 0.003 | Less than 0.002 | 0.055 | 29.68 | 0.184 | 0.429 | 0.051 | 0.243 | 2.00 | 0.002 Zr | 0.008 |
| Inventive steel 9 | 0.007 | 0.240 | 0.151 | Less than 0.003 | Less than 0.002 | 0.041 | 30.42 | 0.185 | 0.964 | 0.050 | 0.247 | 2.03 | | 0.009 |
| Inventive steel 10 | 0.009 | 0.267 | 0.148 | Less than 0.003 | Less than 0.002 | 0.040 | 30.75 | 0.183 | 0.455 | 0.049 | 0.243 | 2.03 | 0.363 V | 0.009 |
| Inventive steel 11 | 0.007 | 0.308 | 0.150 | Less than 0.003 | Less than 0.002 | 0.021 | 30.42 | 0.183 | 0.442 | 0.036 | 0.240 | 2.01 | 0.001 B | 0.008 |
| Comparative steel | 0.008 | 0.40 | 0.34 | Less than 0.003 | Less than 0.002 | 0.003 | 19.33 | 0.14 | 0.45 | — | 0.43 | 0.01 | | 0.008 |

The present inventors measured a initial interfacial contact resistance prior to the surface improvement and a interfacial contact resistance after the chemical improvement at a contact pressure of 140 $N/cm^2$ for each of Inventive steels and Comparative steel as listed in Table 1. The measurement of interfacial contact resistance will be described in more detail with reference to FIG. 4 as described later.

Also, present inventors performed an electrochemical polarization test under a condition that is similar to a cathode environment condition in the fuel cell.

That is to say, a saturated calomel electrode (SCE) of 0.6V is applied as a reference electrode to each of the steels as listed in Table 1 at 70° C. in a mixture solution of 1M sulfuric acid and 2 ppm hydrofluoric acid for 9 hours. Then, the steels were measured for corrosion current density and interfacial contact resistance, and extruded ions of Fe, Cr and Ni were measured in a corrosion solution using ICP (Inductively Coupled Plasma Spectroscopy).

Table 2 lists results of the above-mentioned the experiment.

oxide film, and therefore the potential of the Inventive steel 1 is decreased when the oxide film is removed from the Inventive steel 1.

That is to say, when the stainless steel is immersed in an aqueous sulfuric acid solution, the oxide film is removed from the surface of the stainless steel, and therefore the potential of the Inventive steel 1 is decreased gradually. After a predetermined time, the potential of the Inventive steel 1 is saturated without being decreased any more when the oxide film is completely removed from the surface of the immersed stainless steel.

Therefore, if the stainless steel is immersed in the aqueous sulfuric acid solution at the saturated potential, the oxide may be removed from the surface of the stainless steel.

For the one exemplary embodiment of the present invention, the stainless steel is immersed at 50 to 75° C. in 5 to 20% by weight of an aqueous sulfuric acid solution, and the treatment is carried out for 20 seconds to 5 minutes.

When the temperature and concentration of the aqueous sulfuric acid solution are too low, the oxide film is not easily

TABLE 2

| Kinds | Initial interfacial contact resistance | Contact resistance after chemical surface improvement | Corrosion current density ($\mu A/cm^2$) after electrochemical polarization test | Interfacial contact resistance after electrochemical polarization test | Extracted ion concentration (mg/L) after electrochemical polarization test | | |
|---|---|---|---|---|---|---|---|
| | | | | | Fe | Cr | Ni |
| Inventive steel 1 | 82.29 | 5.17 | 0.08 | 5.84 | 0.023 | No | No |
| Inventive steel 2 | 116.36 | 4.32 | 0.02 | 4.92 | 0.033 | No | No |
| Inventive steel 3 | 101.86 | 4.09 | 0.07 | 4.71 | 0.024 | No | No |
| Inventive steel 4 | 106.02 | 4.35 | 0.03 | 4.52 | 0.017 | No | No |
| Inventive steel 5 | 107.22 | 4.16 | 0.02 | 4.10 | 0.021 | No | No |
| Inventive steel 6 | 110.63 | 4.16 | 0.02 | 5.66 | 0.025 | No | No |
| Inventive steel 7 | 85.97 | 3.70 | 0.04 | 4.99 | 0.018 | No | No |
| Inventive steel 8 | 108.44 | 3.77 | 0.09 | 4.78 | 0.017 | No | No |
| Inventive steel 9 | 85.39 | 3.89 | 0.08 | 4.28 | 0.016 | No | No |
| Inventive steel 10 | 113.98 | 3.74 | 0.03 | 4.23 | 0.019 | No | No |
| Inventive steel 11 | 109.20 | 3.87 | 0.03 | 4.38 | 0.027 | No | No |
| Comparative steel | 74.60 | 8.5 | 0.16 | 5 | 2.135 | 0.505 | 0.005 | removed form the surface of the stainless steel. On the contrary, when the temperature and concentration of the aqueous sulfuric acid solution are too high, a base metal may be damaged. Therefore, the temperature is limited within a range of 50 to 75° C., and the concentration is limited within a range of 5 to 20% by weight.

Figure 3:
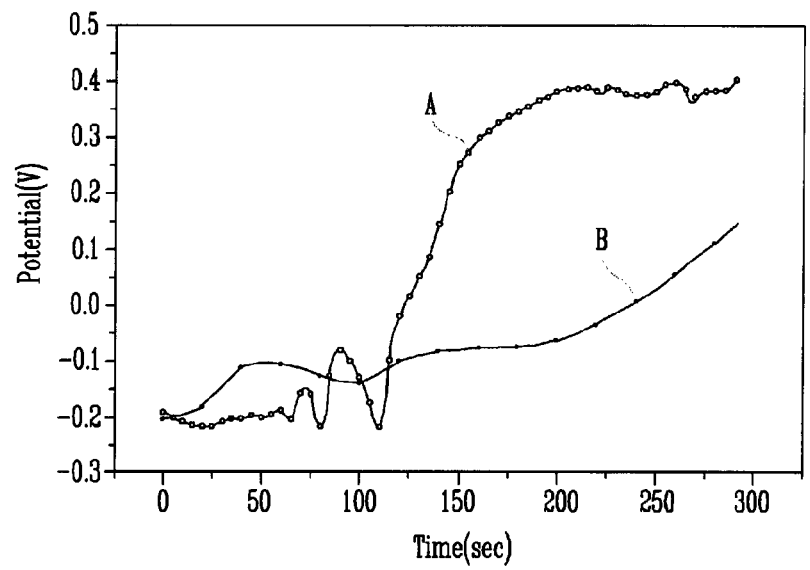
FIG. 3 is a diagram schematically illustrating a potential of Inventive steel 1 measured in a mixture solution including 15% by weight of nitric acid and 5% by weight of hydrofluoric acid using a saturated calomel electrode as a reference electrode.

FIG. 3 is a diagram schematically illustrating a potential of Inventive steel 1 measured in a mixture solution including 15% by weight of nitric acid and 5% by weight of hydrofluoric acid using a saturated calomel electrode as a reference electrode.

When the stainless steel is immersed in oxidizable acid such as a mixture solution of nitric acid and hydrofluoric acid, a passivation layer is formed on a surface of the stainless steel. When the passivation layer is formed on the surface of the stainless steel, a potential of the stainless steel is increased.

Therefore, when the stainless steel is immersed in the mixture solution of nitric acid and hydrofluoric acid at a saturated potential, the passivation layer is completely formed on the surface of the stainless steel.

As shown in FIG. 3, when the stainless steel is immersed in the mixture solution of nitric acid and hydrofluoric acid after pickling with a sulfuric acid (A), the passivation layer is formed on the surface of the stainless steel more rapidly than an immersion without pickling with a sulfuric acid (B). Such results means that the acid cleansing of the stainless steel with sulfuric acid is effective to form a passivation layer having low contact resistance.

The present inventors found that a passivation layer may be effectively formed in a surface of the stainless steel by immersing the stainless steel for 30 seconds to 10 minutes in the mixture solution. This treatment time is varied according to the surface roughness of steel. The manufacturing time may be shortened with increasing surface roughness since a contact area between the mixture solution and the surface of the stainless steel is increased with increasing surface roughness.

As the temperature of passivating process is low, the process is carried out for a long time. Adversely, as the temperature of passivating process is high, the surface of the stainless steel may be damaged, thereby the contact resistance and corrosion resistance may be deteriorated. Therefore, the temperature of passivating process is limited within the range of 40 to 60° C. in the present invention.

Also, it is difficult to passivate the stainless steel when the concentration of the nitric acid is 10% by weight or less, whereas it is difficult to reduce a contact resistance when the concentration of the nitric acid is excessive. Therefore, the concentration of the nitric acid is limited within the range of 10 to 20% by weight in the present invention.

When the concentration of the hydrofluoric acid is 1% by weight or less, the passivation layer may be unstable. On the contrary, when the concentration of the hydrofluoric acid is excessive, the surface of the stainless steel may be damaged, thereby the contact resistance and corrosion resistance may be deteriorated. Therefore, the concentration of the hydrofluoric acid is limited within the range of 1 to 10% by weight in the present invention.

Figure 4:
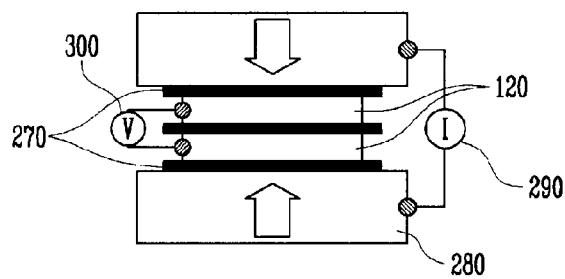
FIG. 4 is a cross-sectional view illustrating an apparatus for measuring interfacial contact resistance of a stainless bipolar plate.

FIG. 4 is a cross-sectional view illustrating an apparatus for measuring interfacial contact resistance of a stainless bipolar plate.

Referring to FIG. 4, this is to measure interfacial contact resistance of a bipolar plate 120. Here, the bipolar plate 120 is measured using a DC 4 terminal method. More particularly, in order to measure interfacial contact resistance of a bipolar plate 120, a plurality of bipolar plates 120 are mounted on a copper end plate 280 together with a carbon paper 270. And a current applying terminal 290 is coupled to the bipolar plate 120 and a voltage terminal 300 is coupled to the copper end plate 280 to measure the interfacial contact resistance of the bipolar plates 120, depending on the applied pressure.

For the one exemplary embodiment of the present invention, the interfacial contact resistance of the bipolar plates 120 is measured at a contact pressure of 140 N/cm$^2$ before/after the chemical improvement of surface properties. The results are listed in the following Table 2.

As listed in the Table 2, it is revealed that the steels have a low initial interfacial contact resistance in case the steels have small contents of Cr and Mo and further include Cu and W.

Also, the steels undergoing the chemical improvement of surface properties according to one exemplary embodiment of the present invention have an interfacial contact resistance of 3 to 6 mΩm$^2$ at a contact pressure of 140 N/cm$^2$. After the above-mentioned electrochemical polarization test, the measured interfacial contact resistance of the steels is within the ranges of 4 to 6 mΩm$^2$, which indicates that the steels have excellent characteristics. The current density after the electrochemical polarization test is also low as 0.5 μA/cm$^2$ or less. The extruded Fe ions are only detected in a concentration of 0.035 mg/L or less when the extruded Fe, Cr and Ni ions is measured from the corrosion solution after the electrochemical polarization test, which indicates that performances of a fuel cell are not deteriorated by extruded ions.

The thicknesses of a passivation layer before/after the chemical improvement of surface properties according to one exemplary embodiment of the present invention are measured using XPS (X-ray Photoelectron Microscopy) and TEM analysis.

Figure 5:
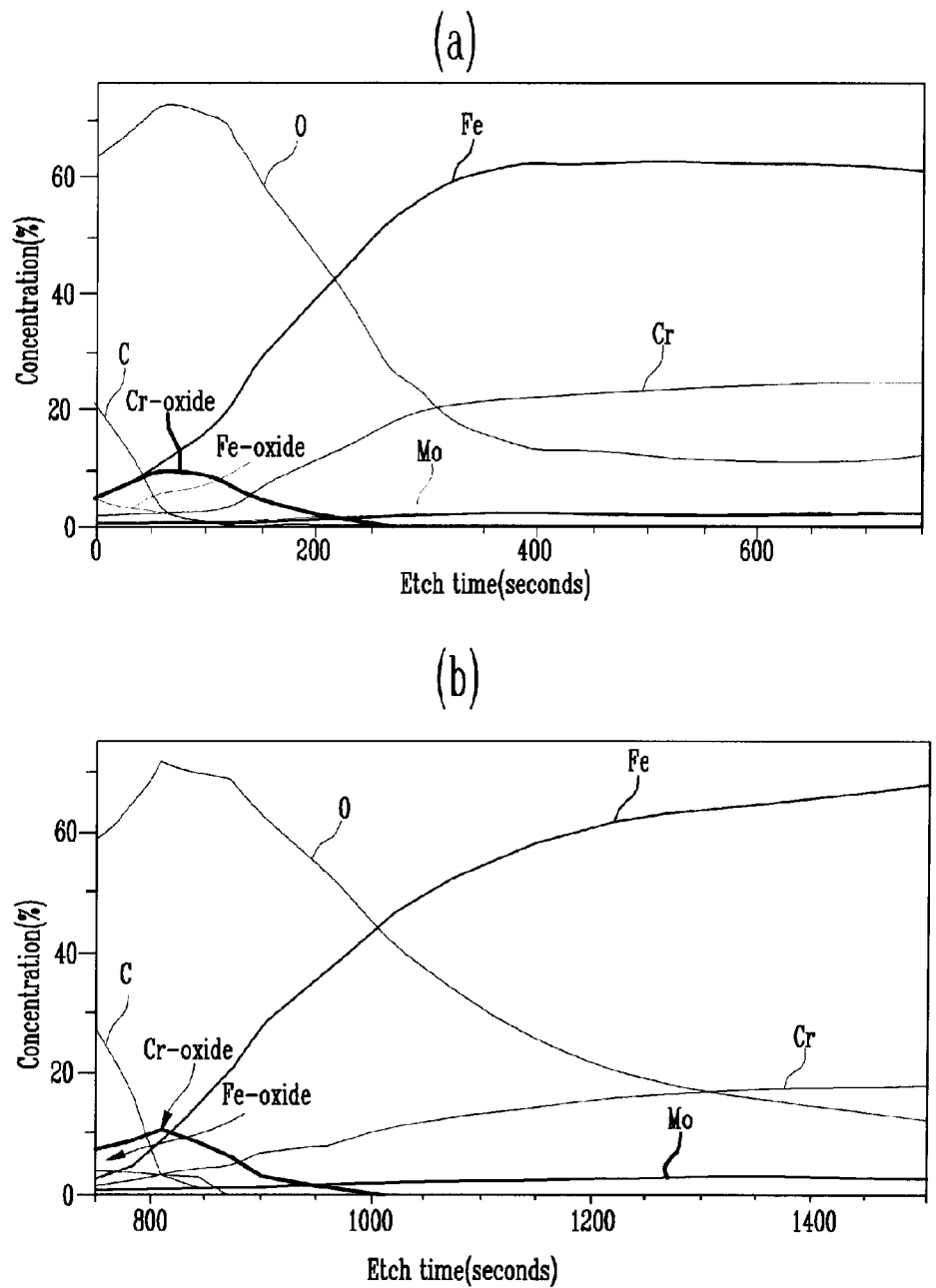
FIG. 5 is a diagram illustrating X-ray photoelectron spectroscopic (XPS) analysis results before/after the chemical improvement of surface properties of Inventive steel 1 as listed in Table 1.

FIG. 5 is a diagram illustrating X-ray photoelectron spectroscopic (XPS) analysis results before/after the chemical improvement of surface properties of Inventive steel 1 as listed in Table 1.

The thicknesses of the passivation layer before the chemical improvement of surface properties (FIG. 5 (a)) and after the chemical improvement of surface properties (FIG. 5 (b)) are compared with each other, as follows.

The thickness of the passivation layer after the chemical improvement of surface properties is 2 to 5 nm, and the concentration distribution of a Cr oxide layer after the chemical improvement of surface properties (the acid cleaning with sulfuric acid and the passivation in a mixture solution) is higher than that of a Fe oxide layer in the outermost surface region with a thickness of 1 nm. Also, Cr (OH)$_3$ and Cr (6+) oxides are present in the surface region, but the Cr (OH)$_3$ is present as a main phase in the surface region. That is to say, it is revealed that a excellent passivation layer is formed in a surface of the stainless steel after the chemical improvement of surface properties.

Figure 6:
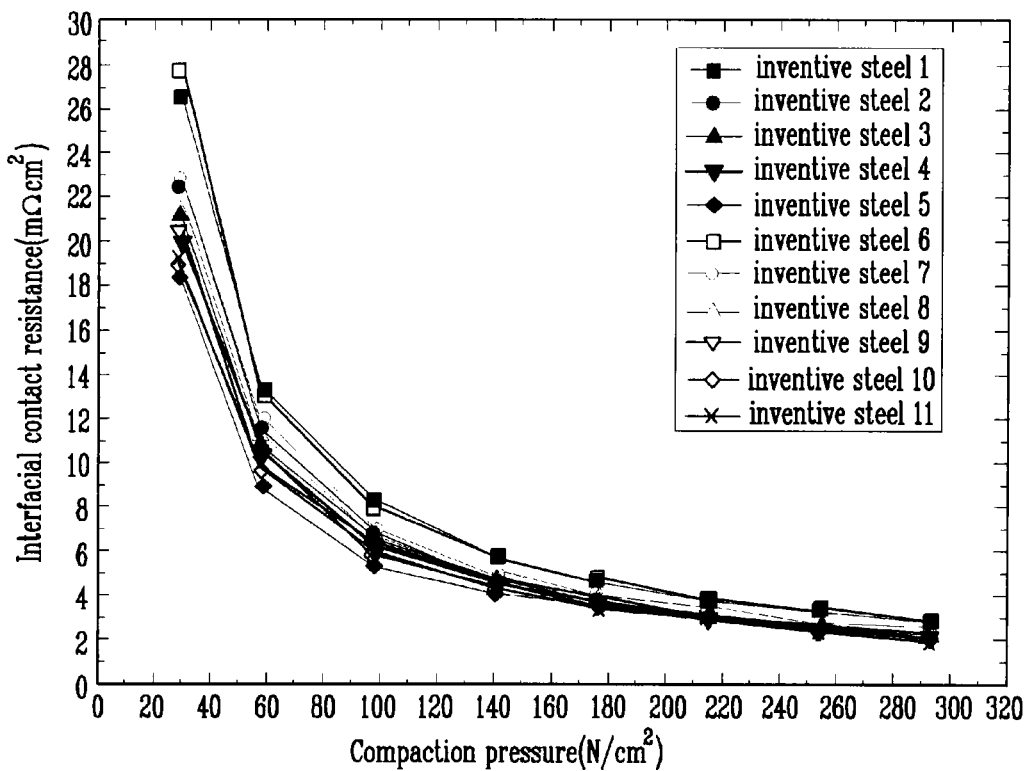
FIG. 6 is a diagram schematically illustrating interfacial contact resistance of stainless steels measured after the chemical improvement of surface properties of Inventive steels and Comparative steel as listed in Table 1.

FIG. 6 is a diagram schematically illustrating interfacial contact resistance of stainless steels measured after the chemical improvement of surface properties of Inventive steels and Comparative steel as listed in Table 1.

As shown in FIG. 6, interfacial contact resistance is measured for each of the steels after the chemical improvement of surface properties according to one exemplary embodiment of the present invention. As a result, it is revealed that all of the stainless steels have excellent interfacial contact resistance of 9 mΩm$^2$ or less at a contact pressure of 140 N/cm$^2$.

Figure 7:
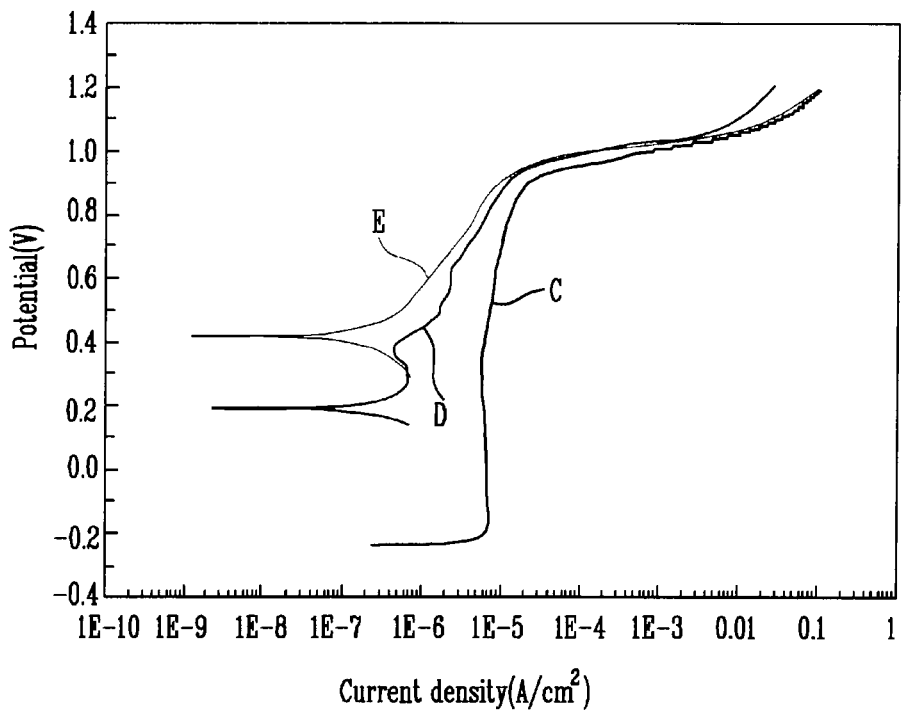
FIG. 7 is a diagram schematically illustrating the current density after the electrochemical polarization test which is measured for the Inventive steel 1 as listed in Table 1.

FIG. 7 is a diagram schematically illustrating the current density after the electrochemical polarization test which is measured for the Inventive steel 1 as listed in Table 1.

According to the one exemplary embodiment of the present invention, a plasma nitriding process is carried out after the above-mentioned chemical improvement of surface properties. The plasma nitriding process will be described in detail, as follows.

A high DC voltage is applied between an anode and a cathode (a bipolar plate 120 corresponds to the cathode in the present invention) to thereby generate glow discharge under the atmosphere of nitrogen, or a mixture gas of nitrogen and hydrogen. In this case, the nitrogen gas is ionized to cover the entire surface of the stainless steel.

The plasma nitride layer covering the surface of the stainless steel is an ionospheric layer of gas ions having a high energy, and the gas ions move toward to a surface of the cathode by the discharge effect. Then, the gas ions are accelerated at a high speed to collide with the stainless steel. The nitrogen ions penetrated into the stainless steel in this manner bind to Cr to form nitrides of $Cr_2N$ and CrN.

When this Cr nitride is formed in a large amount, interfacial contact resistance of the stainless steel may be reduced, but the formation of the Cr-depleted layer may cause the corrosion resistance to deteriorate.

In the present invention, the temperature of the plasma nitriding process is limited within the range of 200 to 500° C., and the plasma nitriding process is carried out for 1 minute to 5 hours.

FIG. 7 shows current densities of the Inventive steel 1 before the improvement of surface properties (C), current densities of the Inventive steel 1, whose surface roughness is originally 0.4 to 1 μm, after the chemical improvement and plasma nitriding process (D), and current densities of the Inventive steel 1, whose surface roughness is originally 0.4 or less, after the chemical improvement and plasma nitriding process (E). The current densities of the Inventive steel 1 is measured by an electrochemical polarization test.

As shown in FIG. 7, it is revealed that the Inventive steel 1 before the improvement of surface properties (C) has the highest current density, and the Inventive steel 1, whose surface roughness is originally 0.4 or less, after the chemical improvement and plasma nitriding process (E) has the lowest current density when the Inventive steel 1 has the same potential.

From the FIG. 7, it is known that the stainless steel has excellent corrosion resistance if the stainless steel undergoes the improvement of surface properties.

Figure 8:
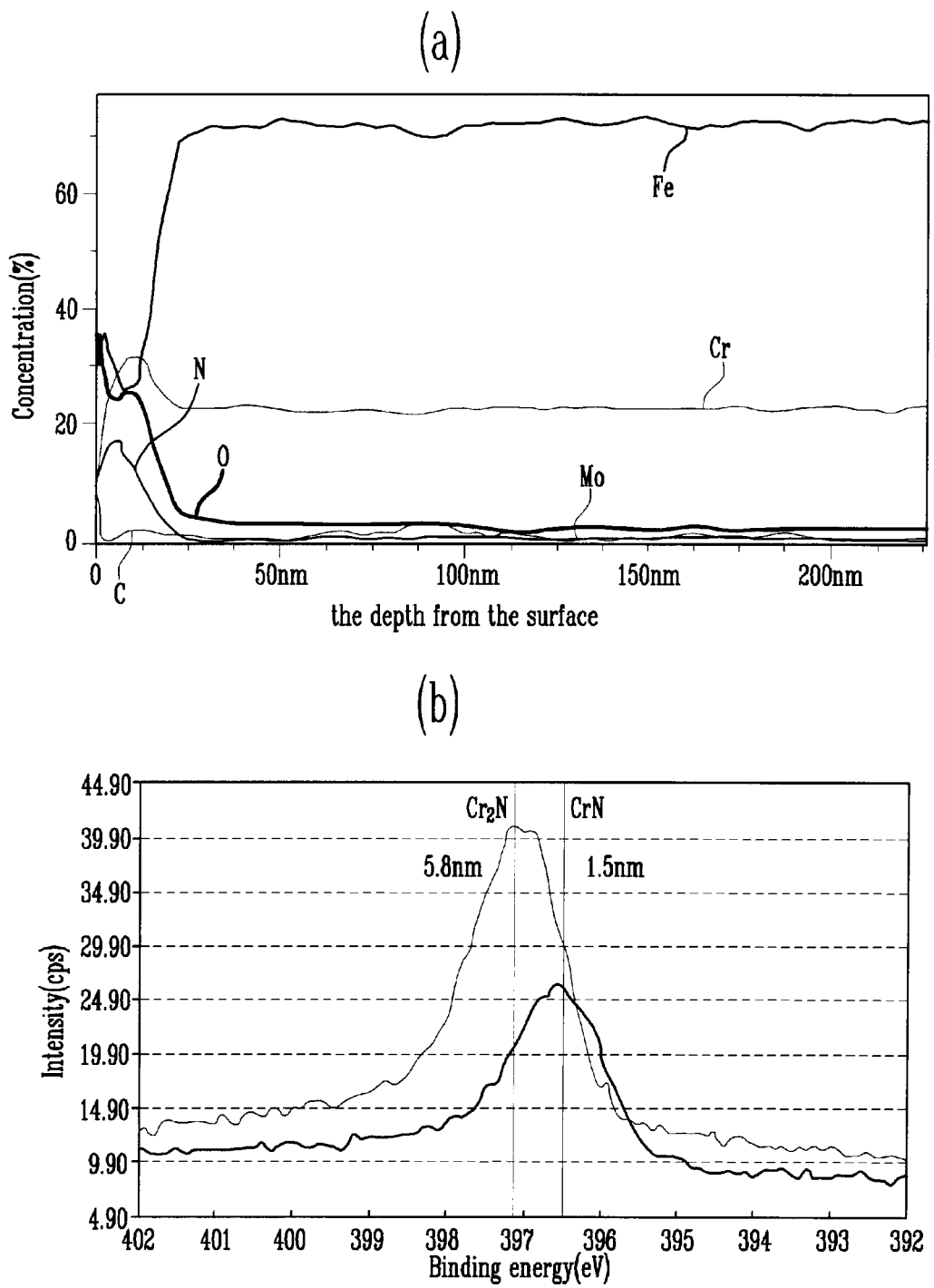
FIG. 8 is a diagram schematically illustrating XPS analysis results for a surface of a stainless steel whose surface properties are improved by the chemical improvement and plasma nitriding process according to one exemplary embodiment of the present invention.

FIG. 8 is a diagram schematically illustrating XPS analysis results for a surface of a stainless steel whose surface properties are improved by the chemical improvement and plasma nitriding process according to one exemplary embodiment of the present invention.

As shown in FIGS. 8 (*a*) and 8 (*b*), for the region of 100 nm or less from surface in the nitride layer, it is known that CrN nitride is mainly observed in a region of 1.5 nm or less from a surface. Also, it is known that $Cr_2N$ nitride is mixed with a chromium oxide layer and an iron oxide layer in a region of 5.8 nm or more from a surface.

The interfacial contact resistance of the stainless steels may be reduced, and its corrosion resistance may be significantly improved by distributing nitrides suitably as described above.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims and equivalents thereof.

The invention claimed is:

1. A method for improving surface properties of stainless steel for bipolar plate of polymer electrolyte membrane fuel cell, the method comprising:
    press forming and hydro forming cold-rolled annealing stainless steel for bipolar plate;
    degreasing the press formed and hydro formed cold-rolled annealing stainless steel;
    pickling the degreased stainless steel with an aqueous sulfuric acid solution, the stainless steel comprising, by weight: C: 0.02% or less, N: 0.02% or less, Si: 0.4% or less, Mn: 0.2% or less, P: 0.04% or less, S: 0.02% or less, Cr: 25~32%, Mo: 0.1 to 5%, Cu: 0.1 to 2%, Ti: 0.5% or less, Nb: 0.5% or less, and the balance of Fe and other inevitable elements;
    washing the pickled stainless steel with water;
    passivating the washed stainless steel by immersing the washed stainless steel in a mixture solution of nitric acid and hydrofluoric acid to form a passivation layer; and
    plasma-nitriding the passivated stainless steel to form a nitride layer on a surface of the stainless steel,
    wherein the nitride layer includes CrN and/or $Cr_2N$ and has a thickness of 0.01 to 100 nm.

2. The method according to claim 1, wherein the stainless steel further comprises one or two or more elements selected from the group consisting of V: 0 to 1%, W: 0 to 4%, La: 0 to 1%, Zr: 0 to 1% and B: 0 to 0.1%.

3. The method according to claim 1, wherein a concentration of the sulfuric acid in the aqueous sulfuric acid solution is 5 to 20% by weight, and the pickling with the aqueous sulfuric acid solution is carried out at a temperature of 50 to 75° C. for 20 seconds to 5 minutes.

4. The method according to claim 1, wherein a concentration of the nitric acid in the mixture solution is 10 to 20% by weight, a concentration of the hydrofluoric acid in the mixture solution is 1 to 10% by weight, and the immersing in the mixture solution is carried out at a temperature of 40 to 60° C. for 30 seconds to 10 minutes.

5. The method according to claim 1, wherein the plasma nitriding is carried out at a temperature of 200 to 500° C. for 1 minute to 5 hours.

* * * * *